Patented Sept. 22, 1925.

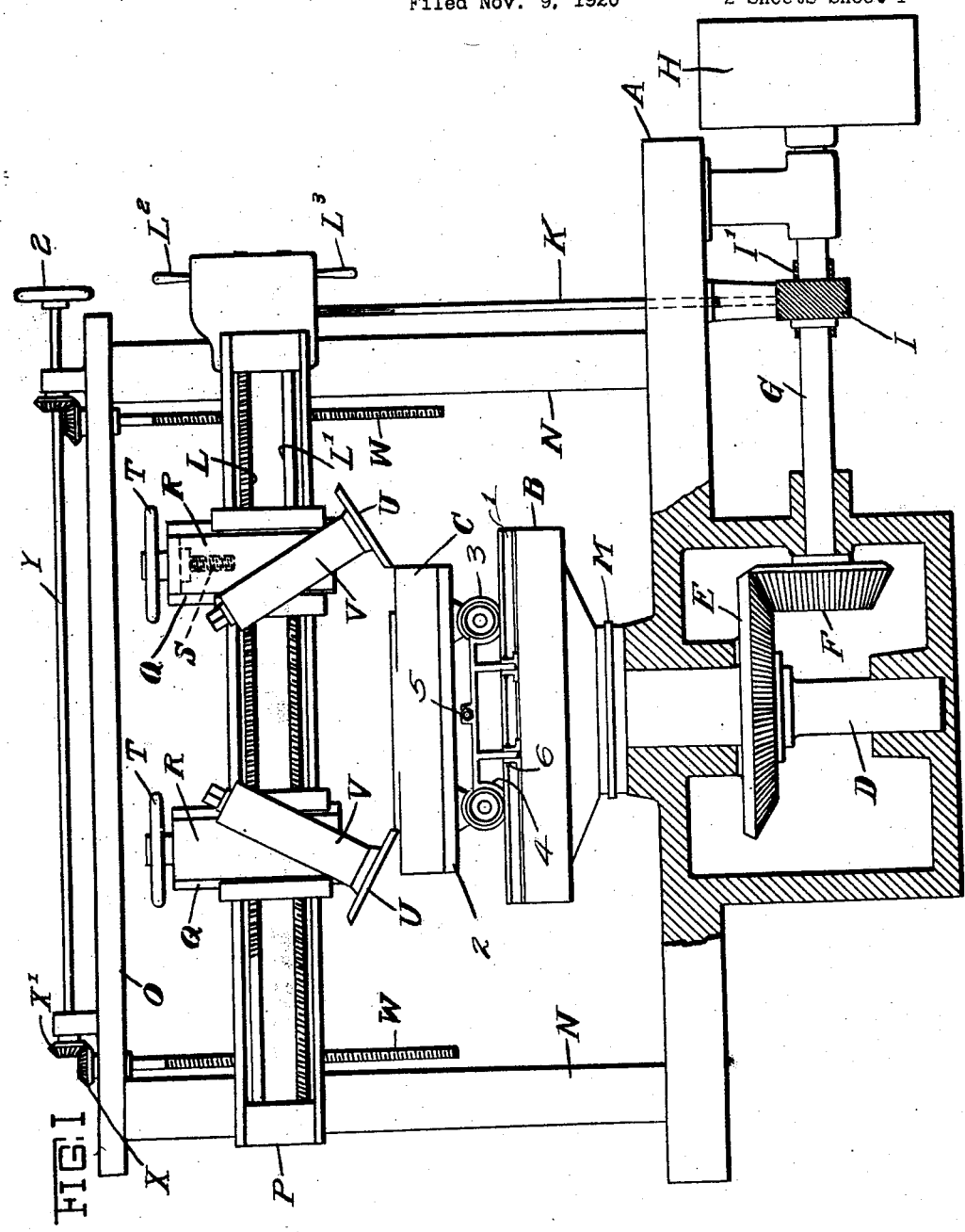

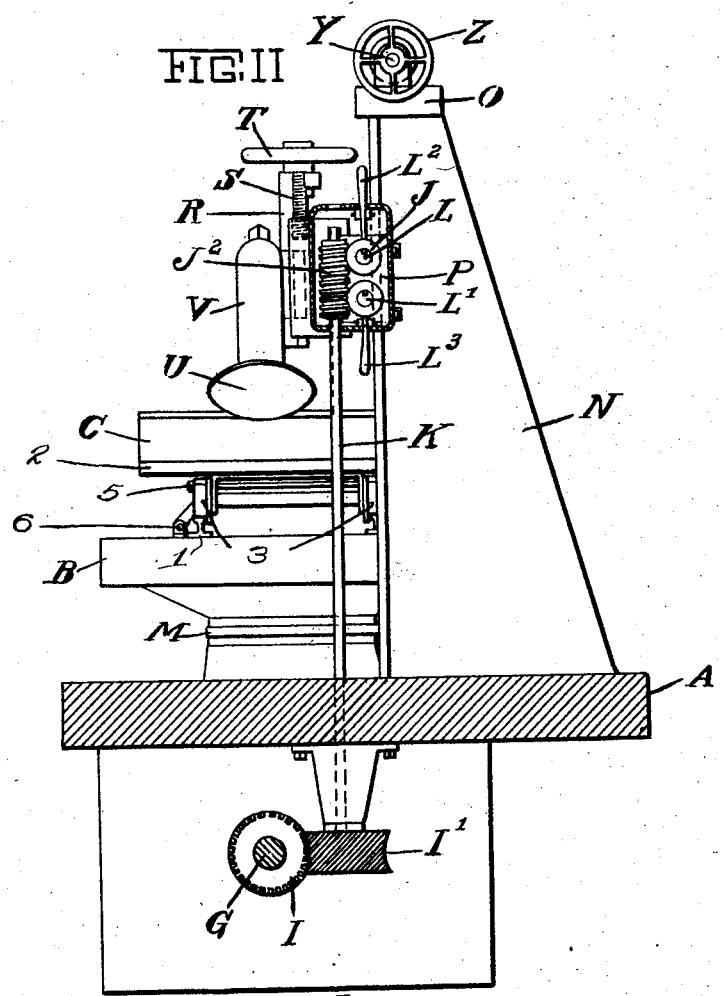
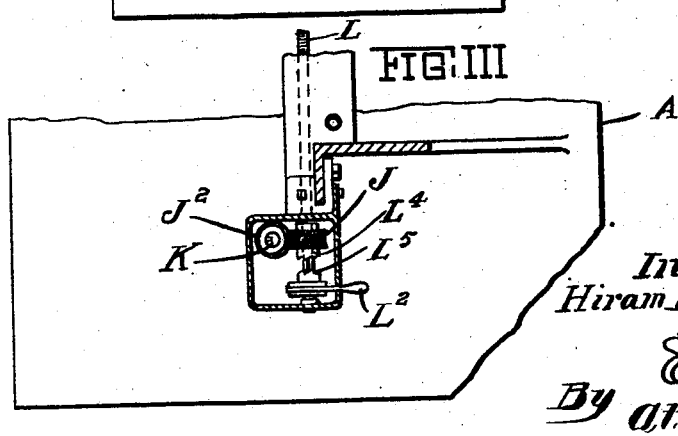

1,554,456

UNITED STATES PATENT OFFICE.

HIRAM DEAN MORRILL, OF NORTHFIELD, VERMONT.

STONE-SURFACING MACHINE.

Application filed November 9, 1920. Serial No. 422,915.

*To all whom it may concern:*

Be it known that I, HIRAM DEAN MORRILL, a citizen of the United States, residing at Northfield, county of Washington, State of Vermont, have invented certain new and useful Improvements in Stone-Surfacing Machines, of which the following is a specification.

This invention relates to surfacing machines and particularly to a machine for surfacing stone.

According to my invention the stone or other work to be surfaced is mounted upon a table which is rapidly rotated relative to one or more cutters which are suitably mounted thereabove for travel across the surface of the stone.

My invention consists in the novel construction and relation of parts described and illustrated in the accompanying specification and drawing and particularly defined in the appended claims. Throughout the specification and drawings like reference characters are correspondingly applied and in the drawings:

Fig. I is a front elevation, partly in section, of a surfacing machine in accordance with my invention.

Fig. II is an end view thereof, and

Fig. III is a partial plan.

I have indicated at A the main frame of my machine. Journaled in suitable bearings upon said frame is a vertically disposed shaft D upon which is supported on anti-friction collars M a main work table B, to which the block of stone or other work to be surfaced, indicated at C, is adapted to be clamped.

As here shown, for convenience of loading, the table B is provided with a trackway 1 which alines with other trackways at either side of the table on the foundation or frame of the machine, whereby one supplemental table 2 of a series of such tables may be quickly rolled onto the trackway 1 at one side of the main table B while at the same time a duplicate supplemental table 2 with a surfaced stone is being removed. Thus one supplemental table 2 may be loaded while another such table is being operated upon.

Each table 2 is constructed as a wheeled truck having wheels 3 adapted to run on the trackways 1. The tables 2 may be clamped in position upon the main table B in any of a variety of ways. For the purposes of this application I have shown a truck clamp comprising hinged and swinging members 4 pivoted outside of the tracks 1 at 6 and adapted to be raised into clamping position after a truck 2 has been rolled onto the main table B. The clamping members 4 extend longitudinally of the trackway 1 at either side of the truck position and are formed at their ends to tightly wedge between the truck wheels when raised and swung inwardly towards each other, being held in such position by a clamping rod 5 having a nut at one end.

The main table B may be turned by any suitable means to aline its rails 1 with the foundation rails whenever the table B is left at a non-aligning position, and the periphery of the table B may be suitably guarded to prevent the ends of the rails 1 from catching on any object as the table rotates.

The shaft D may be provided with a beveled gear E which meshes with a pinion F on a power shaft G suitably journaled upon the main frame A and rotated from any desired power source as by the pulley H.

Rising from the main frame A at either side thereof are spaced uprights or columns N which are connected at their upper ends by a girt O. Slidable on the columns N is a crosshead P operated by a pair of vertically disposed elevating screws W which are adapted to be rotated by the beveled gears X—X', shaft Y and hand wheel Z.

Journaled in the crosshead P is a pair of horizontally disposed cutter feed screws L and L' provided with spiral gears J and J' adapted to mesh with a spiral gear $J^2$ which is keyed to slide on a vertically disposed drive shaft K. The shaft K is journaled in suitable bearings on the main frame A and is driven from the power shaft G by the spiral gears I—I'.

The feed screws L—L' each drives a cutter U—U across the surface of the stone to be dressed. The cutters are hardened steel discs which turn freely under the action of their contact with the rotating stone C. Each cutter is mounted in a suitable bearing upon a spindle V which is carried in a slide R vertically adjustable by a screw S and hand wheel T in a saddle Q mounted on the crosshead P. The screws L and L' operatively engage the saddles Q so that the saddles may be adjusted independently of each other or simultaneously and suitable means may be provided for connecting and disconnecting the feed screws and the saddles.

Such means may be a simple clutch connection between the screws L—L' and the spiral gears J—J' mounted on the ends of the screws, the arrangement being such that the gears are constantly rotated and the screws selectively engaged and disengaged therefrom as desired so that when disengaged they may be turned freely by hand in either direction in order that the cutting discs may be quickly brought to the cutting point before throwing in the power feed. I have indicated the operating levers for the clutch mechanism at $L^2$, $L^3$ and the clutch elements at $L^4$, $L^5$, see Fig. III.

The operation is as follows: The stone or other work to be surfaced is clamped upon the main table B and the power applied to rotate the table. One of the saddles Q on the crosshead is then adjusted until its cutting edge begins to cut the top corner of the stone. The depth of cut may be regulated by the adjustment of the screw S. As will be apparent, the cutter moves towards the center of the stone under the action of its particular feeding screw L or L'. As soon as this cutter is at work, the operative adjusts the corresponding cutter for a light, finishing cut, but before the second cutter, or the saddle therefor, approaches the first cutter sufficiently close enough to interfere with its action, the first cutter will have finished its cut and have been backed off out of the way.

The cutters may be adjusted roughly for stones of varying height by raising or lowering the entire crosshead P and all parts mounted thereon by means of the elevating screws W—W, the spiral gear $J^2$ in such adjustment sliding along the shaft K, and for fine adjustment by moving the slides R in the saddles Q by means of the screws S.

Various modifications in the form and construction of my device may obviously be resorted to without departing from the spirit of my invention, if within the limits of the appended claims.

What I therefore claim and desire to secure by Letters Patent is:

1. In a stone surfacing machine, a rotatable work support, a pair of cutter feeding elements mounted above said support and each having a spiral gear at one end thereof, a cutter mounted upon each feeding element and a drive shaft for said feeding elements having a spiral gear movable therealong and adapted to selectively mesh with either or both of the spiral gears on the cutter feeding elements.

2. In a stone surfacing machine, a rotatable work support, a pair of cutter feeding elements mounted above said support and each having a spiral gear at one end thereof, a cutter mounted upon each feeding element with its axis of rotation at an angle to the axis of rotation of said work support, each cutter rotatable relative to said support by its contact with the rotating stone, and a drive shaft for said cutter feeding elements, having a spiral gear movable therealong and adapted to selectively mesh with either or both of the spiral gears on the cutter feeding elements.

3. In a surfacing machine, a frame, a shaft journaled vertically therein, a work table mounted on said shaft, a pair of spaced vertical uprights mounted on said frame, a crosshead slidable on said uprights, means for adjusting said crosshead on said uprights, a pair of cutter feeding screws mounted on said crosshead and each having a spiral gear at one end thereof, a cutter mounted upon each screw, a shaft having a spiral gear adjustable vertically thereon and adapted to selectively mesh with one or the other of the spiral gears on the cutter feeding screws, and a clutch mechanism for selectively engaging and disengaging said spiral gear with the spiral gears of the screws.

4. In a surfacing machine, a frame, a work revolving shaft journaled vertically therein, a power shaft operatively connected with said work revolving shaft, a work table mounted on said work revolving shaft, a pair of spaced vertical uprights mounted on said frame, a crosshead slidable on said uprights, elevating screws for adjusting said crosshead on said uprights, a pair of cutter feeding screws on said crosshead and each having a spiral gear at one end thereof, a saddle mounted on each screw for movement towards and from each other, a slide adjustable vertically in each saddle, a cutting disc mounted upon each slide, a shaft operatively connected with the power shaft and having a spiral gear adjustable vertically thereon and adapted to selectively mesh with one or the other of the spiral gears on the cutter feeding screws, and a clutch mechanism for selectively engaging and disengaging said spiral gear with the spiral gears of the screws.

5. In combination with a cutter, a work support adjacent said cutter and having a trackway, a wheeled truck adapted to be run onto said trackway, and a normally ineffective truck clamping mechanism mounted adjacent said trackway and movable into effective wedging engagement with the wheels of the truck to restrain the truck against movement along the trackway.

6. In combination with a cutter, a revoluble work support adjacent said cutter and having a trackway, a wheeled truck adapted to be run onto said trackway, and a truck clamping mechanism comprising opposed pivotally mounted clamping members formed at their ends to wedge between the wheels of the truck when raised and swung inwardly towards each other.

7. In combination with a cutter, a revoluble work support adjacent said cutter and having a trackway, a wheeled truck adapted to be run onto said trackway, and a truck clamping mechanism comprising opposed pivotally mounted clamping members formed at their ends to wedge between the wheels of the truck when raised and swung inwardly towards each other, and a clamping member disposed transversely of said members to retain them in clamping position.

8. In combination with a cutter, a revoluble work support adjacent said cutter and having a trackway, a wheeled truck adapted to be run onto said trackway, and a truck clamping mechanism comprising oppositely pivoted clamping members extending longitudinally of the trackway and formed at their ends to wedge between the wheels of the truck when raised and swung inwardly towards each other, and a clamping rod disposed transversely of said members to retain them in clamping position.

In testimony whereof I affix my signature.

HIRAM DEAN MORRILL.